United States Patent
Riess et al.

(10) Patent No.: US 11,746,887 B2
(45) Date of Patent: Sep. 5, 2023

(54) TRANSMISSION OF POWER AND DATA BY MEANS OF AN OIL BUSHING RING

(71) Applicant: ZF Friedrichshafen AG, Friedrichshafen (DE)

(72) Inventors: Christian Riess, Wangen (DE); Umit Kutluay, Friedrichshafen (DE); Philipp Lang, Luebeck (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/622,879

(22) PCT Filed: Jun. 2, 2020

(86) PCT No.: PCT/EP2020/065202
§ 371 (c)(1),
(2) Date: Dec. 27, 2021

(87) PCT Pub. No.: WO2021/004698
PCT Pub. Date: Jan. 14, 2021

(65) Prior Publication Data
US 2022/0260152 A1 Aug. 18, 2022

(30) Foreign Application Priority Data
Jul. 5, 2019 (DE) ...................... 10 2019 209 948.3

(51) Int. Cl.
*F16H 57/04* (2010.01)
*F03D 15/00* (2016.01)
(Continued)

(52) U.S. Cl.
CPC ......... *F16H 57/0482* (2013.01); *F03D 15/00* (2016.05); *F03D 80/70* (2016.05);
(Continued)

(58) Field of Classification Search
CPC ............. F16H 57/0482; F16H 57/0421; F16H 57/0471; F16H 57/082; F03D 15/00;
(Continued)

(56) References Cited

U.S. PATENT DOCUMENTS 10,309,516 B2  6/2019  Camminadi et al.
2005/0051387 A1  3/2005  Flamang et al.
(Continued)

FOREIGN PATENT DOCUMENTS

CN  103748797 A  * 4/2014 ............. H02J 17/00
DE  60307608 T2  10/2007
(Continued)

*Primary Examiner* — Justin Holmes
(74) *Attorney, Agent, or Firm* — LEYDIG, VOIT & MAYER, LTD.

(57) ABSTRACT

An arrangement includes a structure affixed to a housing, a planetary carrier mounted rotatably in the structure affixed to the housing, an oil bushing ring, and a first means and a second means for contactless power transmission. The oil bushing ring forms a lubricant-conducting joint between the structure affixed to the housing and the planetary carrier. The structure affixed to the housing has the first means and the oil bushing ring has the second means.

9 Claims, 1 Drawing Sheet

(51) Int. Cl.
*F03D 80/70* (2016.01)
*F16H 57/08* (2006.01)
(52) U.S. Cl.
CPC ..... *F16H 57/0421* (2013.01); *F16H 57/0471* (2013.01); *F16H 57/082* (2013.01); *F05B 2260/40311* (2013.01)
(58) Field of Classification Search
CPC . F03D 80/70; F03D 17/00; F03D 1/00; F05B 2260/40311; Y02E 10/72; H04B 5/0037
See application file for complete search history.

(56) References Cited

U.S. PATENT DOCUMENTS

2012/0156034 A1* 6/2012 Sabannavar ............ F03D 15/00
416/61
2013/0305827 A1* 11/2013 Kessler ................ G01H 9/004
73/649

FOREIGN PATENT DOCUMENTS

| DE | 102016123434 A1 | 6/2018 | | |
|----|-----------------|--------|---|---|
| EP | 1488139 B1 | 12/2004 | | |
| EP | 3020965 A1 | 5/2016 | | |
| EP | 3182551 A1 * | 6/2017 | ............ | H02J 50/10 |
| WO | WO 2011047089 A1 | 4/2011 | | |
| WO | WO 2016075199 A1 | 5/2016 | | |

* cited by examiner

US 11,746,887 B2

TRANSMISSION OF POWER AND DATA BY MEANS OF AN OIL BUSHING RING

CROSS-REFERENCE TO PRIOR APPLICATIONS

This application is a U.S. National Phase application under 35 U.S.C. § 371 of International Application No. PCT/EP2020/065202, filed on Jun. 2, 2020, and claims benefit to German Patent Application No. DE 10 2019 209 948.3, filed on Jul. 5, 2019. The International Application was published in German on Jan. 14, 2021 as WO 2021/004698 under PCT Article 21(2).

FIELD

The disclosure relates to an arrangement for a planetary transmission.

BACKGROUND

The condition monitoring of planet slide bearings in wind turbine gearboxes can be realized by sensor systems and telemetry on the planet shaft or on the planetary carrier. Since these are rotating components, power supply is a challenge. The inaccessibility of the components and the requirement of 20 years' service life renders a power supply from energy storage systems, such as batteries, impossible. Energy-harvesting approaches for obtaining the energy on the planetary carrier are conceivable, but in many cases do not offer enough power and are also expensive and/or are not ready for series production due to technical deficiencies.

Furthermore, approaches for transmitting power between rotating components by means of slip rings or rotary transmitters, e.g., inductive couplers, are known from other fields. Slip rings are unsuitable due to the 20-year service life requirement. In an annular embodiment, inductive couplers are not available in the dimensions of a planetary carrier. In a rod-shaped embodiment, inductive couplers have the disadvantage that the power is not transmitted continuously. Therefore, a buffer is necessary, and the function is not available in the "pendling" operating mode of a wind turbine, which is relevant for condition monitoring.

A U-shaped oil bushing ring is known from EP 1 488 139 A1. The oil bushing ring serves to transfer oil from a structure affixed to the housing to a rotatably-mounted planetary carrier. The oil bushing ring is affixed to the planetary carrier and engages in a groove of the structure affixed to the housing. This creates a cavity formed by the structure affixed to the housing, by the oil bushing ring, by a bearing of the planetary carrier, and by the planetary carrier itself. This is problematic when the planetary carrier is mounted with its axis of rotation arranged vertically. The oil for lubricating the bearing then collects in the cavity and cannot drain off.

SUMMARY

In an embodiment, the present disclosure provides an arrangement. The arrangement includes a structure affixed to a housing, a planetary carrier mounted rotatably in the structure affixed to the housing, an oil bushing ring, and a first means and a second means for contactless power transmission. The oil bushing ring forms a lubricant-conducting joint between the structure affixed to the housing and the planetary carrier. The structure affixed to the housing has the first means and the oil bushing ring has the second means.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 2:
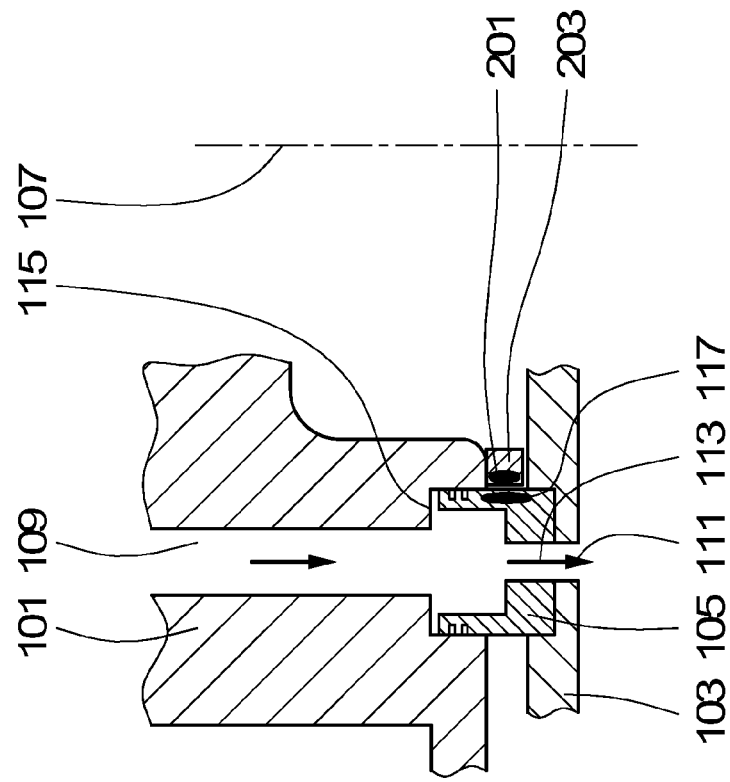
FIG. 2 shows an arrangement with coils.

The disclosure is directed to improving the power supply of sensor systems in the planetary stage of a wind turbine. In particular, a permanent power supply is to be ensured over the entire service life of the system. In addition, the power supply is to be independent of the operating conditions prevailing in each case.

An arrangement according to the present disclosure comprises a structure affixed to the housing and affixed non-rotatably—preferably rigidly—in a gearbox housing, i.e., in such a way that no relative movements are possible, a planetary carrier mounted rotatably in the structure affixed to the housing, an oil bushing ring, a first means for contactless power transmission—hereinafter referred to as a transmitter—and a second means for contactless power transmission—hereinafter referred to as a receiver. The transmitter is thus designed to transmit power contactlessly to the receiver. Therefore, the receiver is designed to receive the transmitted power. This does not preclude the transmission of power in the opposite direction. Depending upon the embodiment and operating state, the transmitter may thus also receive power transmitted by the receiver. The transmitted power is preferably electrical power. It is also possible for data to be transferred uni-directionally or bi-directionally between the transmitter and the receiver, in addition to the power.

An oil bushing ring is a means for directing lubricant between two components which are rotatable relative to each other, and, specifically, between an opening of a lubricant line of a first component and an opening of a lubricant line of a second component. The opening of the lubricant line of the first component and the opening of the lubricant line of the second component are arranged off-center, i.e., their geometric center lies in each case outside the axis of rotation of the first component and the second component, relative to one another. In particular, the openings are not rotationally symmetrical with respect to the axis of rotation.

The oil bushing ring is arranged to be coaxial to an axis of rotation of the planetary carrier. A central axis of the oil bushing ring is identical to the axis of rotation of the planetary carrier. The oil bushing ring preferably runs rotationally symmetrically with respect to the axis of rotation of the planetary carrier and circumferentially surrounds an input shaft, which is connected non-rotatably to the planetary carrier, or a sun shaft which is connected non-rotatably to the sun gear of the planetary stage described above. This means that the input or sun shaft passes through the oil bushing ring or through said axially-extending cavity in the axial direction. As disclosed in EP 1 488 139 A1, the oil bushing ring may be configured as a U-shaped ring.

In the present case, the first component is the structure affixed to the housing, and the second component is the planet carrier. Accordingly, the oil bushing ring forms a lubricant-conducting joint between the structure affixed to the housing and the planetary carrier. The oil bushing ring is either affixed to the planetary carrier and forms a lubricant-conducting joint with the structure affixed to the housing or is affixed to the structure affixed to the housing and forms a lubricant-conducting joint with the planetary carrier.

The disclosure provides for integrating the at least one receiver into the oil bushing ring. According to the disclosure, the oil bushing ring therefore has the at least one receiver. The at least one transmitter is arranged in the structure affixed to the housing.

Since the oil bushing ring extends in the immediate vicinity of the structure affixed to the housing, the disclosure enables an arrangement of transmitter and receiver in the immediate vicinity of one another. In addition, the oil bushing ring extends circumferentially around an axis of rotation of the planetary carrier. It is, therefore, possible to provide receivers in a required number, so that reliable power transmission is ensured even in the "pendling" operating state. The arrangement of the at least one receiver on the oil bushing ring is also advantageous with regard to the available installation space.

In a preferred development, the oil bushing ring consists of plastic—preferably of thermoplastic plastic, e.g. polyamide. In addition to the advantages known from publication EP 1 488 139 A1, a plastic oil bushing ring simplifies the integration of the at least one receiver. The at least one receiver may thus be used during the casting process of the oil bushing ring. Thermoplastic injection molding, for instance, is suitable as a casting process.

A further preferred development accordingly provides that the at least one receiver be cast into the oil bushing ring. The at least one receiver can be cast into an oil bushing ring consisting of plastic, but a molded receiver can be realized with other materials as well.

The at least one receiver is preferably developed as an electric coil, and the at least one transmitter as an electric coil or as a permanent magnet. Since no cabling is necessary, a permanent magnet as the transmitter has the advantage of a particularly simple structure.

Alternatively, it is possible to transmit the power inductively. In this case, the at least one receiver and the at least one transmitter are developed as inductive couplers. As a result, both electrical power and data can be transmitted. In particular, bi-directional transmission is possible.

In a further preferred development, the planetary carrier is provided with at least one sensor. The sensor is preferably used for condition monitoring—for instance, for monitoring the condition of a planetary slide bearing. In order to supply the sensor with power, the development provides at least one means for transmitting power from the at least one receiver to the at least one sensor. In particular, it can be a means for transmitting electrical power—for example, one or more cables.

In order to evaluate the measured data of the at least one sensor, a means for transmitting the measured data is preferably provided. In order to also be able to supply the latter with power, a means for transmitting power from the at least one receiver to the means for transmitting the measured data can be integrated into the planetary carrier. In this case, both the at least one sensor and the means for transmitting the measured data are supplied with power via the at least one receiver.

Preferred exemplary embodiments are shown in the figures. Here, matching reference numbers indicate identical or functionally-identical features.

Figure 1:
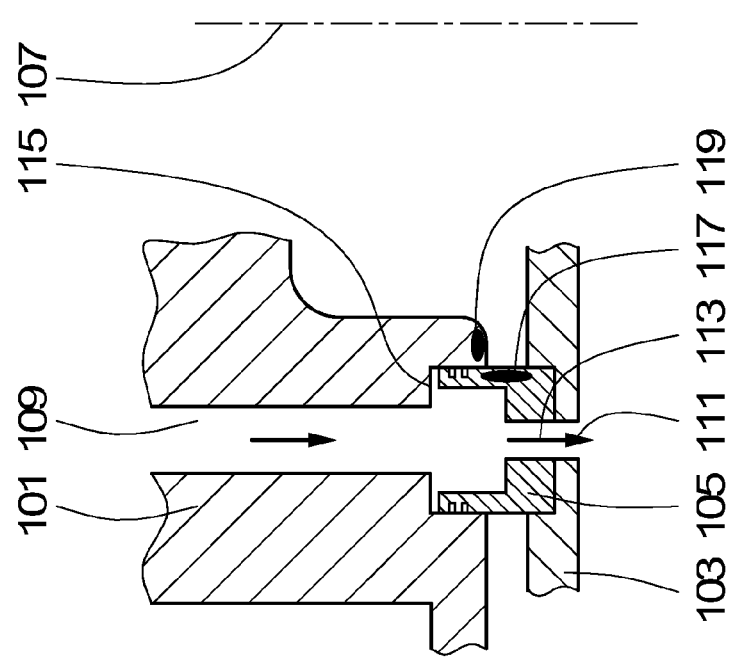
FIG. 1 shows an arrangement with coil and magnet.

Shown In FIGS. 1 and 2 are a gearbox housing 101, a planetary carrier 103, and an oil bushing ring 105. The planetary carrier 103 is mounted rotatably about an axis of rotation 107.

The gearbox housing 101 has a first oil line 109 designed as a bore. A second oil line 111 designed as a bore is located in the planetary carrier 103. Since the planetary carrier 103 is mounted rotatably, the first oil line 109 and the second oil line 111 rotate relative to one another.

The oil bushing ring 105 serves to transfer oil from the first oil line 109 to the second oil line 111. It is affixed to the planetary carrier 103 and has a bore 113 that is aligned with the second oil line 111. Oil can thereby be introduced from the lubricant ring into the second oil line 111.

The oil bushing ring 105 is U-shaped in cross-section and engages in a groove 115 of the gearbox housing 101 so that the oil bushing ring 105 and the groove 115 form an annular cavity. The first lubricant line 109 opens into said cavity.

In order to transfer electrical power from the gearbox housing 101 to the planetary carrier 103, the oil bushing ring 105 is provided with one or more coils 117. The gearbox housing 101 has permanent magnets 119. These are arranged in the immediate vicinity of the coils 117. Therefore, when the planetary carrier 103 rotates, the coils 117 pass the permanent magnets 119 such that an electrical voltage is induced in the coils 117. The induced voltage serves to supply the sensor system in the planetary carrier 113 with electrical power.

Coils 201 can be used instead of the permanent magnets 119, as shown in FIG. 2. The coils 201 are integrated into a carrier 203 attached to the gearbox housing 101. The coils 117 of the oil bushing ring 105 and the coils 201 of the gearbox housing 101 are arranged such that they are inductively coupled.

A magnetic field generated by the coils 201 of the gearbox housing 101 thus induces an electrical voltage in the coils 117 of the oil bushing ring 105 as a function of an angle of rotation position of the planetary carrier 103. Conversely, depending upon the angle of rotation position of the planetary carrier 103, a magnetic field or a magnetic field change of the coils 117 of the oil bushing ring 115 induces an electrical voltage in the coils 201 of the gearbox housing 101. Electrical power and data can thereby be transferred bi-directionally, i.e., starting from the gearbox housing 101 in the direction of the planetary carrier 103 and, in the opposite direction, starting from the planetary carrier 103 in the direction of the gearbox housing.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a"

or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

101 Gearbox housing
103 Planetary carrier
105 Oil bushing ring
107 Axis of rotation
109 Oil line
111 Oil line
113 Bore
115 Groove
117 Coil
119 Permanent magnet
201 Coil
203 Carrier

The invention claimed is:

1. An arrangement, comprising:
a structure affixed to a housing,
a planetary carrier mounted rotatably in the structure affixed to the housing,
an oil bushing ring having a central axis, and
a first means and a second means for contactless power transmission,
wherein the oil bushing ring forms a lubricant-conducting joint between the structure affixed to the housing and the planetary carrier,
wherein the structure affixed to the housing has the first means and the oil bushing ring has the second means, and
wherein the first means is arranged radially further from the central axis of the oil bushing ring than the second means.

2. The arrangement according to claim 1, wherein the oil bushing ring is made of plastic.

3. The arrangement according to claim 1, wherein the first means is configured to be cast into the oil bushing ring.

4. The arrangement according to claim 1, wherein the first means is a coil or a permanent magnet, and wherein the second means is a coil.

5. The arrangement according to claim 1, wherein the planetary carrier has at least one sensor and at least one means for transmitting power from the at least second means to the at least one sensor.

6. The arrangement according to claim 5, wherein the first means and the second means are configured to transmit data between one another.

7. The arrangement according to claim 1, wherein the contactless power is transmitted in a radial direction relative to the central axis of the oil bushing ring.

8. The arrangement according to claim 1, wherein the first means is configured to rotate about the central axis of the oil bushing ring and around a radial circumference delimited by the second means.

9. A planetary transmission, comprising:
a transmission structure affixed to a transmission housing;
a planetary carrier mounted rotatably in the transmission structure;
an oil bushing ring having a central axis, the oil bushing ring forming a lubricant-conducting joint between the transmission structure and the planetary carrier;
a transmitter arranged in the transmission structure; and
a receiver arranged in the oil bushing ring,
wherein the transmitter and the receiver are configured to contactlessly transmit electrical power between one another, and
wherein the transmitter is arranged radially further from the central axis of the oil bushing ring than the receiver.

* * * * *